United States Patent [19]
Knifton et al.

[11] 3,906,045
[45] Sept. 16, 1975

[54] HOMOGENEOUS RUTHENIUM CATALYSTS USEFUL IN THE SELECTIVE REDUCTION OF NITROAROMATICS TO AMINES

[75] Inventors: John F. Knifton, Poughquag; Robert M. Suggitt, Wappingers Falls, both of N.Y.

[73] Assignee: Texaco Inc., New York, N.Y.

[22] Filed: Apr. 22, 1974

[21] Appl. No.: 462,833

Related U.S. Application Data

[63] Continuation-in-part of Ser. No. 121,132, March 4, 1971, Pat. No. 3,832,401, and a continuation-in-part of Ser. No. 193,204, Oct. 27, 1971, abandoned.

[52] U.S. Cl.................................. 260/580; 252/431
[51] Int. Cl............................................. C07c 85/11
[58] Field of Search.................................... 260/580

[56] References Cited
UNITED STATES PATENTS 3,110,747  11/1963  Mullineaux .................... 260/580 X
3,694,509  9/1972  Rylander et al. .............. 260/580 X

*Primary Examiner*—Paul F. Shaver
*Attorney, Agent, or Firm*—T. H. Whaley; C. G. Ries; Bernard Marlowe

[57] ABSTRACT

This invention concerns the use of solubilized homogeneous ruthenium catalysts to initially and sequentially reduce the nitro group in mononitroaromatic substrates to the corresponding amine. The reduction must be carried out in a two component mixture consisting essentially of the mononitroaromatic and a mononitro ortho-substituted polyalkylaromatic component. In order to minimize the reduction of said nitropolyalkylaromatic component, the reduction should be halted when between about 80 to 95 % of the mononitroaromatic substrate present is reduced to the corresponding amine.

17 Claims, No Drawings

HOMOGENEOUS RUTHENIUM CATALYSTS USEFUL IN THE SELECTIVE REDUCTION OF NITROAROMATICS TO AMINES

This invention is a continuation-in-part of Ser. No. 121,132, filed Mar. 4, 1971 now U.S. Pat. No. 3,832,401 and Ser. No. 193,204 filed Oct. 27, 1971 now abandoned.

BACKGROUND OF THE INVENTION

This invention concerns the use of homogeneous catalysts to sequentially reduce nitroaromatic substrates to their corresponding amines. More particularly, this invention concerns the use of certain solubilized ruthenium complexes as homogeneous hydrogenation catalysts for the sequential reduction of nitroaromatic, polynitroaromatic, nitropolynucleararomatic, and polynitropolynucleararomatic mixtures.

The preferred reduction process concerns the use of solubilized, empirically derived homogeneous ruthenium catalysts to initially, selectively and sequentially reduce the sole nitro group in mononitroaromatic substrates contained in two component nitroaromatic substrate mixtures, one component of which is the more readily reducable mononitroaromatic substrate, the second component being a mononitro ortho-substituted polyalkylaromatic substrate.

Many compounds of ruthenium have been described in the literature, some of which have been proposed as catalysts for the homogeneous hydrogenation of organic compounds. Nevertheless, a recent review of homogeneous catalysis processes for hydrogenation reactions* appears to document the paucity of reported sequential reductions of nitroaromatics.

*Lyons et al.-Ind.Eng.Chem.Prod.Res.Develop.

Recently, in related work (Ser. No. 121,132, filed 3/4/72 and Ser. No. 193,204 filed 10/27/71) it was reported that a hydrogenation process using homogeneous metal complexes, particularly ligand stabilized ruthenium and iron complexes, were generally useful as catalysts for the hydrogenation of nitroaromatics to aromatic amines. These homogeneous catalysts were shown to hydrogenate nitroaromatics at room temperature with hydrogen pressures below 20 atmospheres, at especially high substrate-to-catalyst molar ratios (exceeding 200), and whose selectivity to amine generally ranges from about 85% to 100%.

It has now been found that certain ruthenium complexes and, in particular, complexes of ruthenium containing $\pi$-Acceptor ($\pi$-Acid)* ligands, exhibit an unexpected selectivity when used as catalysts in the hydrogenation of mixtures of nitroaromatics, nitropolynucleararomatics, polynitroaromatics or polynitropolynucleararomatics. This is particularly the case in two component nitroaromatic mixtures wherein one component is a mononitroaromatic substrate, the other component being a mononitropolyalkyl aromatic.

As far as can be seen from a review of the current literature, the instant invention is believed to represent the first illustration of a catalyst system, heterogeneous or homogeneous, for this type of sequential hydrogenation. Smith, for example, in a review of the catalytic hydrogenation of nitro compounds reports no such selectivity with Raney nickel and platinum heterogeneous catalysts. Similarly, though both Calderazzo et al.* and S. Murahashi and S. Horie**** report the reduction of nitrobenzene to aniline using soluble carbonyl catalysts under stringent reaction conditions of temperature and pressure, neither group of workers has reported the sequential hydrogenation of nitroaromatic mixtures.

*For a discussion of $\pi$-Acceptor ($\pi$-Acid) ligands see: Vol.9,p.1, Manl. 1970 H. A. Smith and W. C. Bedoit, Jr., "Catalysis" Vol III, Page 149 (1955) *Calderazzo et al. - Inorganic Chem., 9, 342 (1970 ) ****Murahashi et al. - Bull. Chem. Soc. Japan, 33,78(1960)

In view of the aforementioned deficiencies of both heterogeneous and homogeneous catalysts in the hydrogenation of nitroaromatics, the catalysts of this invention represent a substantial advance in the art.

According to the broadest concept of the invention, a process for the sequential homogeneous hydrogenation of a nitroaromatic mixture as hereinafter defined, comprises contacting the substrate mixture with hydrogen in the presence of a solution containing as catalyst a soluble ruthenium compound containing one or more $\pi$-Acceptor ($\pi$-Acid) ligand, and arresting the reaction when the substrate mixture has reacted to the desired degree of hydrogenation.

Sequential hydrogenation as defined most broadly concerns the reduction of specific nitro ($NO_2$) groups of nitroaromatic, polynitroaromatic, nitropolynucleararomatic or polynitropolynucleararomatic substrates to the desired amines with the exclusion of the reduction of other nitro groups. However, these other nitro groups may also be reduced to the amine following substantial completion of the initial desired nitro reduction reaction. For example, the ruthenium complexes described in this invention may be used to reduce one or more nitro groups to amine in preference to the other or others, provided that the hydrogenation is arrested at a suitable stage. In some instances, better than 95% of one type of nitro groups may be hydrogenated before the others begin to react. It will be appreciated, however, that should the reaction be allowed to proceed unchecked, in most cases all of the nitro groups present would eventually be reduced to the amine, and the effect of the selectivity of the ruthenium catalyst would then be lost.

In the preferred process, sequential hydrogenation is much more specifically defined. That is, sequential hydrogenation utilizes solubilized empirically derived homogeneous ruthenium catalysts to preferentially reduce the mononitroaromatic substrates contained in a two-component mixture consisting essentially of said mononitroaromatic substrate and a mononitro ortho-substituted polyalkyl aromatic substrate.

The mixture will always contain non-substrate components such as ruthenium catalyst and may contain optional solvents inert to hydrogenation. The hydrogenation of the mononitroaromatic to the corresponding amine will virtually exclude the reduction of the nitrodialkylaromatic component of the mixture as long as the reduction is halted when between about 75% to about 80% of the mononitroaromatic substrate is reduced to the amine.

It is an object of this invention to provide recent but known homogeneous transition metal complexes, especially complexes of ruthenium and mixtures thereof, which will sequentially hydrogenate nitroaromatic, polynitroaromatic, nitropolynucleararomatic and polynitropolynucleararomatic mixtures. The sequential hydrogenation of this process falls within certain general classes which include:

a. The selective hydrogenation of polynitroaromatics in preference to nitroaromatics or intermediate nitroaromatic amines, for example, the selective hydrogenation of p-nitrobenzene to p-nitroaniline in the presence of nitrobenzene and the p-nitroaniline formed thereof.

b. The selective hydrogenation of nitropolynucleararomatics in preference to nitroaromatics, e.g., the reduction of 1-nitronaphthalene to α-naphthylamine in the presence of nitrobenzene.

c. The selective hydrogenation of polynitropolynucleararomatics in preference to nitroaromatics or the intermediate nitropolynucleararomatic amines, e.g., the reduction of 1,4-dinitronaphthalene to 4-nitro-1-naphthylamine in the presence of nitrobenzene.

d. The selective hydrogenation of polynitroaromatics in preference to nitropolynucleararomatics or the intermediate nitroaromatic amines, e.g., the reduction of p-dinitrobenzene to p-nitroaniline in the presence of 1-nitronaphthalene.

e. The selective hydrogenation of polynitropolynucleararomatics in the presence of nitropolyaromatics in the intermediate nitropolynueleararomatic amines, e.g., the reduction of 1,4-dinitronaphthalene to 4-nitro-1-naphthylamine in the presence of 1-nitronaphthalene.

f. The selective removal of small concentrations of m-dinitrobenzene present in crude nitrobenzene produced by benzene nitration.

g. The selective and preferential hydrogenation of mononitroaromatic substrates contained in two component substrate mixtures consisting essentially of said mononitroaromatic and mononitro ortho-substituted polyalkylaromatics until substantially all of the mononitroaromatic present is converted to the corresponding amine. An illustrative hydrogenation is:

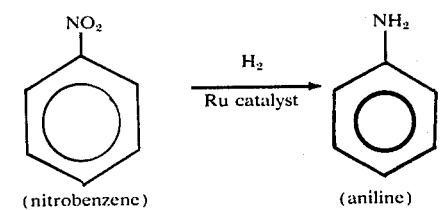

(1)

(nitrobenzene) (aniline)

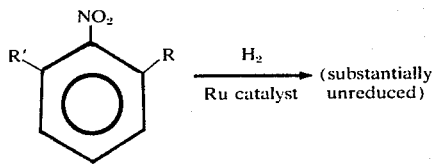

(2)

wherein R and R' which can be the same or different alkyl radicals preferably contain 1 to 4 carbon atoms.

h. The selective and preferential hydrogenation of mononitroaromatic substrates contained in two component substrate mixtures consisting essentially of a mononitroaromatic substrate and a mononitro ortho-substituted nitropolyalkylaromatic substrate, until substantially all the mononitroaromatic substrate present is substantially converted to the corresponding amine. An illustrative embodiment follows:

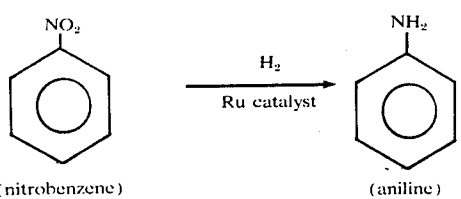

(3)

(nitrobenzene) (aniline)

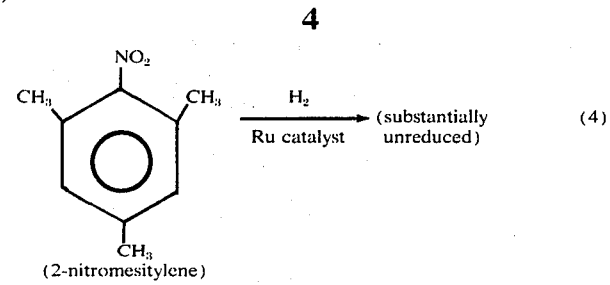

(4)

(2-nitromesitylene)

i. The selective and preferential hydrogenation of 1,2-dimethyl-4-nitrobenzene contained in a two-component substrate mixture of 1,2-dimethyl-4-nitrobenzene and 1,3-dimethyl-2-nitrobenzene until substantially all of the 1,2-dimethyl-4-nitrobenzene (80%) is converted to 3,4-xylidene (Eq.5) leaving the 1,3-dimethyl-2-nitrobenzene substantially unchanged (<5% conversion). The reaction is shown below.

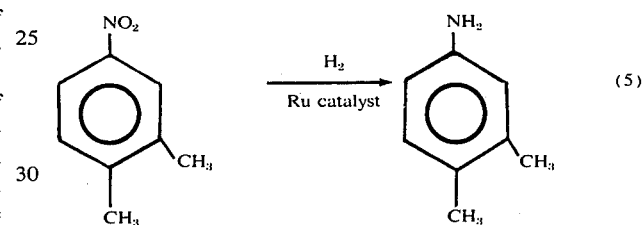

(5)

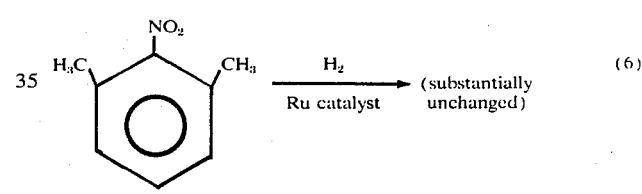

(6)

j. The selective and preferential hydrogenation of 1-nitronaphthalene contained in a two component substrate mixture of 1-nitronaphthalene and 2-nitromesitylene until substantially all of the 1-nitronaphthalene is converted to 1-naphthalamine. (Eq.7)

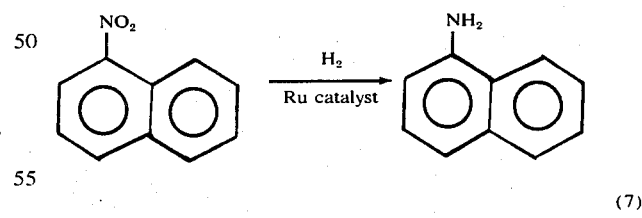

(7)

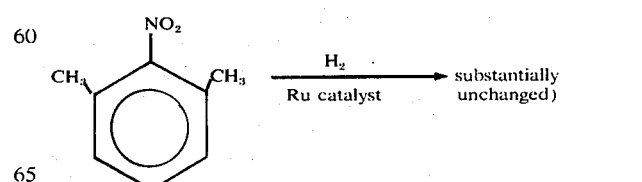

(8)

Other objects will become apparent to those skilled in the art after a perusal of this application.

In practice, the above objects, among others, will be achieved by the following procedure or minor modifications thereof:

In the broadest contemplated practice, a. at least a molar excess of a nitroaromatic, polynitroaromatic, nitropolynucleararomatic or polynitropolynucleararomatic mixture to be reduced is admixed in the absence of oxidizing conditions with a catalytic amount of a ruthenium complex in a substantially non-aqueous, inert solvent media, sufficient to at least partially solubilize said substrate and catalyst to form a reaction media, b. then said reaction media is heated from at least about 20°C and upwards under superatmospheric pressures in the presence of at least a stoichiometric quantity of hydrogen (with respect to nitroaromatic substrate) until substantial reduction of at least one of the nitroaromatic substrates to the corresponding amine or nitroamine takes place, and c. the amine contained therein is separated.

In the favored practice a substantially anhydrous, deoxygenated, substantially nonaqueous reaction mixture comprising the nitroaromatic substrate is formed by:

a. admixing at least a 5 molar portion* of a nitroaromatic, nitropolynucleararomatic, polynitroaromatic or polynitropolynucleararomatic mixture with one molar portion of at least one ruthenium catalyst complex, in the presence of sufficient inert solvent media to at least partially solubilize said substrate and catalyst, said solvent media being selected from the group consisting of essentially neutral media, alkaline and acidic media, said reaction mixture being substantially free of oxidizing agents,

*These 5 molar figures represent proportions or ratios of the substrate to the catalyst rather than absolute numbers b. heating said reaction mixture while free from oxidizing agents between about 20° and 160°C under initial upwards, pressures ranging from about 100 psig and upward, said pressure being supplied by at least a stoichiometric excess of gaseous hydrogen (with respect to nitroaromatic substrate in the mixture), said heating taking place in a substantially anhydrous environment, for at least a time sufficient to substantially reduce at least one of the said nitroaromatic substrates to its corresponding amine or nitroamine and c. isolating said amine or nitroamine contained therein.

In the preferred practice, selective and sequential hydrogenation (reduction) of the nitro group of mononitroaromatic substrates to the corresponding amine is achieved as follows:

a. a forming a two component mixture consisting essentially of one component of more readily hydrogenatable class of mononitroaromatic substrates and a second component of nitroaromatics more recalcitrant to hydrogenation than the first group of mononitroaromatics* referred to generically as mononitro ortho-substituted nitropolyalkylaromatics.

b. admixing said two component reaction mixture with an optional, inert solvent or solvents, with at least a catalytic quantity of homogeneous ruthenium catalyst (to be described infra) in a non-aqueous, non-oxidizing atmosphere and media to form a reaction mixture;

c. heating said reaction mixture between about 50° to about 135°C with hydrogen gas provided under superatmospheric pressures and in sufficient quantity to hydrogenate said nitro group of the mononitroaromatic substrate, said heating being continued for a time sufficient to substantially hydrogenate the more readily hydrogenatable mononitroaromatic substrate without forming significant quantities of the more recalcitrant nitroaromatic component.

*See Examples 13,14 20–35 and the claims of this application directed to said selective and sequential hydrogenation process.

The stage of the hydrogenation at which the process should be arrested may be readily determined by experiment. For example, a mixed substrate may be hydrogenated under carefully controlled conditions using the process of this invention, and the product analyzed at regular intervals. The results of these analyses may then be plotted on a graph from which it may be readily deduced at what stage the maximum concentration of the required product will be present in the mixture. The product mixture may be analyzed by any convenient technique, but gas/liquid chromatography methods are preferred.

Once the pattern of the sequential hydrogenation of a particular mixed substrate with a particular ruthenium catalyst has been established, hydrogenation may be arrested at the appropriate time by rapid cooling of the reaction mix and by removal of the remaining hydrogen gas.

In order to aid in the full understanding of the inventive concept, the following additional disclosure is submitted:

A. NITROAROMATIC SUBSTRATES — Any aromatic substrate containing from 6 to 30 carbon atoms, or more, and containing at least one nitro ($NO_2$) group per molecule may be employed. These include the mononuclear mononitroaromatics such as nitrobenzene, nitrotoluenes, nitroxylenes as well as the dinuclear, trinuclear and higher (polynuclear) mononitroaromatics such as 1-nitronaphthalene and 5-nitroanthracene. The di- and trinitro aromatics, that is di-, trinitromononuclear compounds such as m-dinitrobenzene and its congeners may also be substrates, in addition to di-, tri and polynitropolynuclear aromatics such as 1,9-dinitronaphthalene and its homologues and, where they are available, nitro steroids. The nitro group need not be directly bonded to the aromatic ring but can include derivatives such as nitrobenzyl, wherein the nitro group is attached to an alkylene group and separated from an aromatic nucleus by groups containing 1 to 3 carbon atoms. Inasmuch as the starting materials are more readily available at lower costs, the favored nitro-aromatic substrates are those wherein from 1 to 3 nitro groups are bonded to mono, di or trinuclear (benzene) ring systems containing from 0 to 3 alkyl groups per ring. The nitrated aromatics can be derived from any number of different nitration procedures, such as vapor-liquid phase nitration, liquid-liquid procedures, etc. The substrate can be in the form of nitrated aromatics containing substantial quantities of non-nitrated aromatics or their mixtures, neat or containing other inert solvents or diluents, such as paraffins, ethers, and the like.

The preferred nitroaromatic substrates which make up the first of two component mixtures discussed previously, consist essentially of one class of mononitroaromatics (such as nitrobenzene, p-nitrotoluene, 2-nitronaphthalene) which are more readily hydrogenated than the second component, the mononitro ortho-substituted polyalkylaromatics which are much less readily reduced (referred to as the more recalcitrant group or class earlier in this disclosure) under the same catalytic hydrogenation conditions. This first group are mononuclear or dinuclear and can contain from 6 to 30 carbon atoms, or more but can only contain one (1) nitro group per molecule. Further there can only be one such readily reducible substrate in the two component mixture at a given time. Finally, since once the one nitro group of the more readily reducible group is substantially reduced (usually from about 75% conversion to about 90% conversion) the nitro group of the second component, while more recalcitrant to hydrogenation also will become reduced. Thus the reaction must not only be halted before a conversion of nitro group to amine of about 80% to about 95% is obtained in the first component but equally important, the hydrogenation must be halted before a significant conversion of the more recalcitrant nitro groups in the second component is obtained. A significant amount of conversion as defined herein refers to from about 5 to 10% of undesired conversion.

Illustrative of the more readily hydrogenatable mononitroaromatic substrates include nitrobenzene, p-nitrotoluene, m-nitrotoluene, p-nitroethylbenzene,1,2-dimethyl-4-nitrobenzene, 1,2-dimethyl-3-nitrobenzene, 1,4-dimethyl-2-nitrobenzene, 1,3-dimethyl-4-nitrobenzene, 1,3-dimethyl-5-nitrobenzene, 1-nitronaphthalene, 2-nitronaphthalene, p-nitrocyclohexylbenzene, 4-nitrobiphenyl, 9-nitroanthrene.

Illustrative of the mononitro ortho-substituted polyalkylaromatics include 1,3-dimethyl-2-nitrobenzene, 2-nitromesitylene, nitrodurene and 1,3-diethyl-2-nitrobenzene, among others.

B. CATALYST SYSTEM - The homogeneous catalysts of this invention are selected from complexes of ruthenium, containing ruthenium in varying oxidation states, usually between zero and +4, and prepared by the well documented references in the technical literature. The ruthenium complex must contain one or more $\pi$-Acceptor ($\pi$-Acid) ligands. Particularly favored are ligands containing a donor atom of Group IVB, Group VB or Group VIB. Examples include the organic substituted phosphine or stibene ligands such as $PR_3$ of $SbR_3$, where R represents hydrocarbyl radicals which may be the same or different, e.g., alkyl, aryl, aralkyl or cycloalkyl and those derived from the quaternary phosphonium ion such as $[PR_4]+$. Alternatively, the ruthenium complex may contain one or more other $\pi$-Acceptor ligands such as carbonyl (CO), substituted carbonyl or nitrosyl, either alone, or in addition to the ligand or ligands containing a donor atom of Groups IVB, VB or VIB. Suitable anionic ligands include $Cl^-$, $Br^-$, $CN^-$, $NCO^-$, and $CH_3COO^-$. Halogens are the preferred anionic ligands.

Illustrative ruthenium complexes which function effectively as selective reducing agents in the claimed process include $RuCl_2(P(C_6H_5)_3)_3$, $RuHCl(P(C_6H_5)_3)_3$, $RuCl_3[As(C_6H_5)_3]_2$, $RuCl_2(Sb(C_6H_5)_3)_3$, $RuCl_3(NO)(P(C_6H_5)_3)_2$, $RuCl_2[P(pCH_3.C_6H_4)_3]_3$, $RuCl_2(CO)_2(P(C_6H_5)_3)_2$, $[Ru(CO)_3Cl_2]_2$, $RuCl_2[P(CH_3)_2.C_6H_3]_3$, $RuCl_2(As(et_2(C_6H_5))_3$, $Ru(CO)_3(P(C_6H_5)_3)_2$, and $RuCl_3(P(C_6H_5)_3)_2$.

*Et is used as a symbol for the $CH_3CH_2$-radical

In contrast to Ser. No. 121,132 filed Mar. 4, 1971, iron complexes which contain $\pi$-Acceptor ligands, such as $Fe(CO)_3(P(C_6H_5)_3)_2$, do not function as selective hydrogenation catalysts for mixed nitroaromatic substrates, and so are not suitable as catalysts in this process. Ruthenium complexes which do not contain $\pi$-Acceptor ($\pi$-Acid) ligands, such as ruthenium acetylacetonate and ruthenium naphthenate, are also nonselective and therefore unsuitable catalysts for this process.

Preferably, but not necessarily, the ruthenium catalyst is one which contains displaceable ligands. However, in some instances it is desirable to use a solvating agent to convert the ruthenium compound to a more soluble form. The solvating agent usually comprises a polar solvent having an active hydrogen atom preferably contained in a hydroxyl group. Suitable solvating agents include the lower alkanols such as ethanol and propanol, cycloaliphatic or aromatic alcohols and phenols, as well as the mixtures of these alkanols and aromatics either in the neutral or alkaline state.

It is thought, without limiting the invention thereby, that the solvating agent functions by promoting conversion or the ruthenium compound catalyst to a hydrido species, which is soluble in the liquid medium used.

It is not essential that all of the ruthenium compound shall be in solution at the beginning of the reduction provided that at least a catalytic amount is present. A catalytic amount as defined herein refers to an amount sufficient under the appropriate combination of temperature and pressure parameters to initiate the desired reduction. In the instance of ruthenium, if at least 0.0001 moles, preferably at least 0.001, of ruthenium per mole of nitroaromatic are present, catalysis will take place. Higher ratios of catalyst to substrate give more rapid conversion although ratios of 0.1 or more are disadvantageous in that they are costly and entrap or entrain product, unnecessarily complicating isolation and purification.

The mole ratio of nitroaromatic substrates to homogeneous ruthenium catalyst should not exceed about 1000:1, especially to achieve optimum yields, within a reasonable period of time without having reproducibility problems. As previously disclosed ratios of the individual nitroaromatic substrate to catalyst lower than about 10:1 are to be avoided if the aromatic amine product is to be isolated. For the best balance of yield to reaction time, ratios varying from about 10:1 to 100:1 of each nitroaromatic substrate to catalyst, should be employed.

C. INERT DILUENT AND SOLVENTS - The novel reduction process can be run most readily in the presence of sufficient inert diluent to form a homogeneous single-phase reaction mixture. Since a homogeneous, or uniform, reaction mixture offers the most convenient vehicle in which to rapidly and selectively reduce the nitroaromatics to amines in good yield, the use of inert solvent is employed. Generally speaking, any organic liquid in which the nitroaromatic substrate and catalyst are soluble and which is inert to reduction under the conditions of the inventive process, can be used as a diluent. These include the alkyl ethers, such as diethyl ether, the $C_1$ to $C_6$ alkanols, the hydroxylated ethers, chlorinated hydrocarbons such as methylene chloride, aromatics such as benzene, toluene and xylene, as well as their mixtures with or without alkaline or acid agents. The choice of whether to use an acidic, alkaline or neutral polar solvent system depends primarily upon the nitroaromatic to be reduced.

D. REDUCING ATMOSPHERE - Insofar as can be determined, the homogeneous catalyst, possibly in some intermediate, more active form, abstracts hydrogen from the environmental, hydrogen atmosphere. While nitrogen, methane, ethane, or inert gases such as helium, argon or neon may be present in small proportions, (less than 30% by volume) without adversely effecting conversions or yields, their presence appears to offer no concurrent advantages and, therefore, is to be avoided.

Ordinarily, a reaction vessel capable of being pressurized, agitated, heated and cooled is charged with all of the components of the reaction mixture i.e., the nitroaromatic mixture, catalyst system, solvents, etc. These components either individually or collectively are flushed with inert gas such as argon or nitrogen because of their known sensitivity to oxidizing agents such as air. The residual flushing or purging of inert gaseous environment is conveniently accomplished with hydrogen or nitrogen and the reaction mixture is pressurized initially to the desired extent and heated in a substantially hydrogen atmosphere until the desired reduction to aromatic amine takes place.

E. REDUCTION TEMPERATURE - The reaction temperature for reduction is in many ways quite flexible. At temperatures below about 20°C, however, the rate of reduction of substrate to the amine is quite slow, while at temperatures much above 160°C yields fall off sharply, probably due to catalyst decomposition, and for this reason these temperatures in excess of 160°C are to be avoided. Since good results have been obtained between 35°C and 160°C these are favored. Inasmuch as the best yields of amine have been obtained at reduction temperatures between about 50°C and 135°C at superatmospheric pressures, when the preferred homogeneous ruthenium complexes are used as catalyst, these temperatures represent the preferred temperature range.

F. REDUCTION PRESSURES - Pressures of hydrogen greater than atmospheric (O psig) are required to obtain reasonable rates of reduction at reaction temperatures above 35°C. Superatmospheric hydrogen pressures ranging from about 100 psig to about 2000 psig, coupled with temperatures of about 35°C to 135°C consistently give the best yields within reasonable reaction times and for this reason are preferred.

G. REACTION TIMES FOR SUBSTANTIAL REDUCTION - The time required for substantial reduction of the nitroaromatics to the corresponding amines is a variable, dependent primarily upon the temperature and pressure employed, the choice of catalyst and nitroaromatic substrate mixture to be reduced, and the ratio of substrate to catalyst system employed, among other factors. Ordinarily the reaction times will vary between about 10 minutes to 24 hours, according to whether all the nitro ($-NO_2$) groups present are to be hydrogenated to amine, or whether some intermediate species are to be isolated.

H. EXPERIMENTAL PROCEDURE - The reductive process is ordinarily performed as follows:

A conveniently sized reactor fitted with gas inlet, condenser, stirring, heating and pressurizing means, is charged with catalyst solution, preferably deoxygenated during charging, and containing the 2-component nitroaromatic substrate mixture (i.e., mononitroaromatic and mononitro ortho-substituted polyalkyl aromatic). Deoxygenation can be accomplished by a hydrogen or nitrogen flush of the reaction mixture. The agitated reaction mixture is sealed and heated to above 20°C under superatmospheric pressure provided by hydrogen under pressure.

The rate of hydrogenation may be monitored by gas chromatography analysis, and reduction arrested at the appropriate point by rapidly cooling the reaction mixture, and bleeding off the remaining hydrogen gas.

Work-up of the product mixture is as follows:

The mixture of amine product, unreacted nitroaromatics, ruthenium complex catalyst and light solvent is stripped under reduced pressure to remove the volatiles, and the spent ruthenium catalyst is filtered or removed by centrifugation. The aromatic amine product contained in the filtrate is then recovered by one or more of the methods used to separate amines from contaminants. For example, the amine can be steam distilled or extracted with mineral acid. In the latter case, the amine salt is converted (sprung) to the free amine by neutralization with a basic material.

In any event, the amine product can be further purified or used as obtained, dependent upon product application. In general, the amines are identified by gas chromatography (gc), infrared spectra (ir) and/or nuclear magnetic resonance (nmr) spectra.

Having described the inventive process in general terms, the following examples are submitted to supply specific illustrative embodiments. Unless otherwise specified, all the temperatures are in centigrade and all parts are by weight rather than by volume. Examples 13,14 and 20–35 disclose the basis of the claimed preferred sequential hydrogenation of one of the two component nitroaromatic mixtures.

EXAMPLE 1

THE SEQUENTIAL HYDROGENATION OF NITROBENZENE-p-DINITROBENZENE MIXTURE USING $RuCl_2[P(C_6H_5)_3]_3$ AS CATALYST

To a suitable autoclave-type reactor provided with pressurizing, heating, cooling, agitating and distillation means is charged 100 ml of a deoxygenated 1:1 equi-volume solvent mixture of benzene and ethanol containing the tris (triphenylphosphine)ruthenium(II) chloride catalyst (0.38g, 0.4 mmoles), equimolar quantities of nitrobenzene (1.02 mmoles) and p-dinitrobenzene (1.68 g, 10 mmoles). After sealing the solution mixture under an initial nitrogen pressure of 100 psig, and heating to 120°C, hydrogen gas is introduced into the reactor to a partial pressure of 1200 psig, and the reduction of the nitroaromatics followed by gc analyses of samples withdrawn at regular time intervals. The progress of the hydrogenation may be seen from the results in Table I below:

TABLE I

SEQUENTIAL HYDROGENATION OF A NITROBENZENE-p-DINITROBENZENE MIXTURE CATALYZED BY RuCl$_2$(P(C$_6$H$_5$)$_3$)$_3$

| Time from Start (Min.) | CONVERSION OF: | | |
|---|---|---|---|
| | p-Dinitrobenzene to p-Nitroaniline (%) | p-Nitroaniline to p-Phenylenediamine (%) | Nitrobenzene to Aniline (%) |
| 20 | 20 | <1 | <1 |
| 40 | 50 | <1 | <1 |
| 60 | 74 | <1 | <1 |
| 80 | 88 | <1 | <1 |
| 100 | 97 | <1 | <3 |
| 120 | >99 | <1 | 3 |
| 150 | >99 | <1 | 11 |
| 180 | >99 | <1 | 27 |
| 210 | >99 | 15 | 56 |
| 250 | >99 | 40 | 88 |
| 300 | >99 | 80 | >99 |
| 350 | >99 | >99 | >99 |

It will be seen that:

1. At least 95% of the p-dinitrobenzene is hydrogenated to p-nitroaniline before a measurable amount of nitrobenzene has been converted to aniline.

2. About 30% of the nitrobenzene is hydrogenated to aniline before a significant amount of p-nitroaniline intermediate has been converted to p-phenylenediamine.

Should it be desired to isolate the intermediate reduction products, hydrogenation may be arrested at the appropriate time by cooling and bleeding off the excess hydrogen gas. The recovered product solution is then concentrated by removing the light solvents, and the precipitated ruthenium catalyst. The latter is filtered off and recovered as a brown solid, which is washed with a fraction of petroleum ether and air dried. The nitroamine or diamine products may be isolated either by distillation or acid extraction.

EXAMPLE 2

THE SEQUENTIAL HYDROGENATION OF NITROBENZENE-m-DINITROBENZENE MIXTURE USING RuCl$_2$(P(C$_6$H$_5$)$_3$)$_3$ AS CATALYST

The procedure of Example 1 is followed using an equimolar substrate mixture of nitrobenzene (1.02 ml, 10 mmoles) and m-dinitrobenzene (1.68 g, 10 mmoles) in a 1:1 ethanol/benzene solution.

The results of the hydrogenation are given in Table II.

It will be seen that some 95% of the m-dinitrobenzene is hydrogenated to m-nitroaniline before the m-nitroaniline so produced or the nitrobenzene already present have begun to react.

This result, and that of Example 1, confirms that the RuCl$_2$(P(C$_6$H$_5$)$_3$)$_3$ homogeneous catalyst will selectively hydrogenate polynitroaromatics in preference to nitroaromatics and the intermediate nitroaromatic amines.

TABLE II

SEQUENTIAL HYDROGENATION OF A NITROBENZENE-m-DINITROBENZENE MIXTURE CATALYZED BY RuCl$_2$(P(C$_6$H$_5$)$_3$)$_3$

| Time from Start (Min.) | CONVERSION OF: | | |
|---|---|---|---|
| | m-Dinitrobenzene to m-Nitroanilines (%) | Nitrobenzene to Aniline (%) | m-Dinitrobenzene to m-Phenylenediamine (%) |
| 20 | 54 | <1 | <1 |
| 40 | 69 | <1 | <1 |
| 60 | 79 | <1 | <1 |
| 90 | 88 | <1 | <1 |
| 120 | 95 | 2 | <1 |
| 150 | >99 | 4 | <1 |
| 180 | " | 9 | <1 |
| 240 | " | 32 | 16 |
| 300 | " | 63 | 31 |

EXAMPLES 3 to 8

THE SEQUENTIAL HYDROGENATION OF NITROBENZENE-p-DINITROBENZENE MIXTURES USING CERTAIN OTHER RUTHENIUM CATALYSTS

Utilizing the apparatus, reduction procedure and equimolar nitrobenzene, p-dinitrobenzene substrate mixture of Example 1, various ruthenium complexes were employed as sequential hydrogenation catalysts in the subject application.

As can be seen from the data in Tables III to VI, the p-dinitrobenzene fraction is preferentially hydrogenated to p-nitroaniline to the substantial exclusion both of the nitrobenzene and the p-nitroaniline intermediate with the following types of catalyst:

a. The ruthenium (II) tricarbonyl dimer [Ru(CO)$_3$Cl$_2$]$_2$ b. The triphenylphosphine ruthenium (II) carbonyl: [RuCl$_2$(CO)$_2$[P(C$_6$H$_5$)$_3$]$_2$ c. The triphenylstibene ruthenium (II) complex: [RuCl$_2$(Sb(C$_6$H$_5$)$_3$)$_3$]

d. The ruthenium (III) Triphenylphosphine complex: RuCl$_3$(P(C$_6$H$_5$)$_3$)$_2$ No such selectivity was found with:

a. Ruthenium acetylacetonate
b. Ruthenium naphthenate

With these two latter complexes the nitrobenzene and p-dinitrobenzene fractions were reduced concurrently, with some difference in rate.

This result confirms that only ruthenium complexes containing one or more $\pi$-Acceptor ($\pi$-Acid) ligands will sequentially hydrogenate mixtures of polynitroaromatics and nitroaromatics.

TABLE III

SEQUENTIAL HYDROGENATION OF A NITROBENZENE-p-DINITROBENZENE MIXTURE CATALYZED BY [Ru(CO)$_3$Cl$_2$]$_2$

| Time from Start (Min.) | CONVERSION OF: | | |
|---|---|---|---|
| | p-Dinitrobenzene to p-Nitroaniline (%) | p-Nitroaniline to p-Phenylenediamine (%) | Nitrobenzene to Aniline (%) |
| 20 | 6 | <1 | <1 |
| 40 | 14 | <1 | <1 |
| 60 | 27 | <1 | <1 |
| 80 | 50 | <1 | <1 |
| 100 | 81 | <1 | <1 |
| 120 | 99 | <1 | 5 |
| 150 | >99 | <1 | 14 |
| 180 | >99 | <1 | 23 |
| 240 | >99 | <1 | 41 |
| 300 | >99 | 5 | 59 |

TABLE IV

SEQUENTIAL HYDROGENATION OF A NITROBENZENE-p-DINITROBENZENE MIXTURE CATALYZED BY $RuCl_2(CO)_2(P(C_6H_5)_3)_2$

| Time from Start (Min.) | CONVERSION OF: | | |
|---|---|---|---|
| | p-Dinitrobenzene to p-Nitroaniline (%) | p-Nitroaniline to p-Phenylenediamine (%) | Nitrobenzene to Aniline (%) |
| 10 | 13 | <1 | <1 |
| 20 | 24 | <1 | <1 |
| 40 | 51 | <1 | <1 |
| 80 | 61 | < | <1 |
| 120 | 78 | <1 | <1 |
| 160 | 92 | <1 | <1 |
| 200 | >99 | <1 | 4 |
| 240 | >99 | <1 | 13 |
| 280 | >99 | <1 | 22 |
| 320 | >99 | 2 | 31 |
| 360 | >99 | 3 | 40 |

TABLE V

SEQUENTIAL HYDROGENATION OF A NITROBENZENE-p-DINITROBENZENE MIXTURE CATALYZED BY $RuCl_2(Sb(C_6H_5)_3)_3$

| Time from Start (Min.) | CONVERSION OF: | | |
|---|---|---|---|
| | p-Dinitrobenzene to p-Nitroaniline (%) | p-Nitroaniline to p-Phenylenediamine (%) | Nitrobenzene to Aniline (%) |
| 20 | 23 | <1 | <1 |
| 40 | 48 | <1 | <1 |
| 60 | 76 | <1 | <1 |
| 70 | 88 | <1 | 2 |
| 80 | 99 | <1 | 6 |
| 110 | >99 | <1 | 24 |
| 150 | >99 | <1 | 59 |
| 180 | >99 | 6 | 79 |
| 240 | >99 | 69 | 96 |
| 300 | >99 | 88 | >99 |

TABLE VI

SEQUENTIAL HYDROGENATION OF A NITROBENZENE-p-DINITROBENZENE MIXTURE CATALYZED BY $RuCl_3(P(C_6H_5)_3)_2$

| Time from Start (Min.) | CONVERSION OF: | | |
|---|---|---|---|
| | p-Dinitrobenzene to p-Nitroaniline (%) | p-Nitroaniline to p-Phenylenediamine (%) | Nitrobenzene to Aniline (%) |
| 5 | 60 | <1 | <1 |
| 10 | 79 | <1 | <1 |
| 20 | 98 | <1 | 2 |
| 40 | >99 | <1 | 6 |
| 80 | >99 | <1 | 16 |
| 120 | >99 | <1 | 26 |
| 180 | >99 | 1/43 | |

EXAMPLE 9 – 11

THE NON-SELECTIVE HYDROGENATION OF NITROBENZENE-p-DINITROBENZENE MIXTURE USING IRON CATALYSTS

The procedure of Example 1 was repeated using the same equimolar nitrobenzene, p-dinitrobenzene substrate mixture and bis(triphenylphosphine) iron tricarbonyl in 1:1 benzene, ethanol as the homogeneous catalyst.

The results of the hydrogenation are given in Table VII.

It can be seen that the p-dinitrobenzene and nitrobenzene fractions are reduced concurrently, the latter at a somewhat lower rate. However, it should be noted that the p-nitroaniline intermediate is not further reduced until essentially all the p-dinitrobenzene has been partially hydrogenated. This is consistent with the claims of Ser. No. 121,132, filed 3/4/71.

A similar result was found with:
1. iron naphthenate; 2. iron acetylacetonate.

TABLE VII

HYDROGENATION OF A NITROBENZENE-p-DINITROBENZENE MIXTURE CATALYZED BY $Fe(CO)_3(P(C_6H_5)_3)_2$

| Time from Start (Min.) | CONVERSION OF: | | |
|---|---|---|---|
| | p-Dinitrobenzene to p-Nitroaniline (%) | Nitrobenzene to Aniline (%) | p-Nitroaniline to p-Phenylenediamine (%) |
| 10 | 34 | 4 | <1 |
| 20 | 56 | 8 | <1 |
| 40 | 80 | 16 | <1 |
| 60 | 93 | 24 | <1 |
| 80 | >99 | 32 | 3 |
| 120 | >99 | 47 | 16 |
| 160 | >99 | 63 | 28 |
| 200 | >99 | 78 | 47 |
| 240 | >99 | 92 | 69 |

Iron complexes and salts are therefore not sequential hydrogenation catalysts for the reduction of nitroaromatic, polynitroaromatic mixtures to amine.

EXAMPLE 12

THE SEQUENTIAL HYDROGENATION OF NITROBENZENE-1-NITRONAPHTHALENE MIXTURE USING $RuCl_2[P(C_6H_5)_3]_3$ AS CATALYST

The procedure of Example 1 was followed using the same catalyst but a substrate comprising an equimolar mixture of nitrobenzene (1.02 ml, 10 mmole) and nitronaphthalene (1.73 g. 10 mmole) in equivolume benzene, ethanol solution.

The results of the hydrogenation are summarized in Table VIII. Here it can be seen that 1-nitronaphthalene is selectively reduced to α-naphthylamine, at least up to 40% conversion of the nitronaphthalene. Beyond the 40% conversion point, however, reduction of both nitrocompounds takes place concurrently.

TABLE VIII

SEQUENTIAL HYDROGENATION OF A NITROBENZENE-1-NITRONAPHTHALENE MIXTURE CATALYZED BY $RuCl_2(P(C_6H_5)_3)_3$

| Time from Start (Min.) | CONVERSION OF: | |
|---|---|---|
| | 1-Nitronaphthalene to α-Naphthylamine (%) | Nitrobenzene to Aniline (%) |
| 5 | 9 | <1 |
| 10 | 16 | <1 |
| 20 | 28 | <1 |
| 30 | 38 | 2 |
| 40 | 46 | 3 |
| 50 | 52 | 6 |
| 60 | 58 | 10 |

EXAMPLE 13

THE SELECTIVE AND SEQUENTIAL HYDROGENATION OF 2-nitro-mesitylene-1-NITRONAPHTHALENE MIXTURE USING $RuCl_2(P(C_6H_5)_3)_3$ AS CATALYST The procedure of Example 1 was followed using a 10 mmoles a nitroaromatic of anitroaromatic mixture of 2-nitromesitylene and 1-nitronaphthalene in 1:1 ethanol/benzene.

The results of the hydrogenation are given in Table IX.

It will be seen that some 95% of the 1-nitronaphthalene had been converted to α-naphthylamine (Eq.9) before a significant portion of the 2-nitromesitylene had begun to react. (Eq.10)

The hydrogenation was repeated using an isopropanol/benzene mixture, and gave a similar result.

The data of Table IX confirm that the $RuCl_2(P(C_6H_5)_3)_3$ complex is a selective hydrogenation catalyst for the reduction of mononitroaromatic, mononitro ortho substituted polyalkylaromatic mixtures.

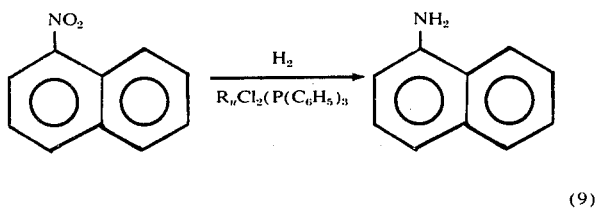

(9)

Subsequent hydrogenation reaction:

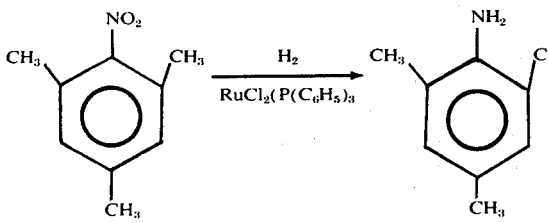

(10)

TABLE IX
SELECTIVE AND SEQUENTIAL HYDROGENATION OF A 2-NITROMESITYLENE-1-NITRONAPHTHALENE MIXTURE CATALYZED BY $RuCl_2(P(C_6H_5)_3)_3$

| Time from Start (Min.) | CONVERSION OF: 1-Nitronaphthalene to α-Naphthylamine (%) | 2-Nitromesitylene to Mesidine (%) |
|---|---|---|
| 20 | 47 | 1 |
| 40 | 65 | 1 |
| 60 | 77 | 1 |
| 80 | 87 | 1 |
| 100 | 95 | 2 |
| 120 | >99 | 6 |
| 180 | " | 23 |
| 270 | " | 55 |
| 380 | " | >99 |

EXAMPLE 14

SELECTIVE AND SEQUENTIAL HYDROGENATION OF 2-NITROMESITYLENE-1-NITRONAPHTHALENE MIXTURE USING $RuCl_2(CO)_2(P(C_6H_5)_3)_2$ AS CATALYST

In this example, the apparatus and reduction procedure of Example 1 were used with 0.4 mmole (0.29 g) of the ruthenium complex $RuCl_2(CO)(P(C_6H_5)_3)_2$ dissolved in 100 ml of equivolume benzene ethanol containing 10 mmole each of 2-nitromesitylene and 1-nitronaphthalene, as the charge solution. The progress of the hydrogenations, which were run at 120°C, is shown in Table X.

It is apparent that at least 96% of the 1-nitronaphthalene fraction may be reduced to α-naphthylamine (Equation 9 above) with this catalyst prior to any noticable reduction of the 2-nitromesitylene (Equation 10).

TABLE X
SELECTIVE & SEQUENTIAL HYDROGENATION OF A NITROMESITYLENE-NITRONAPHTHALENE MIXTURE CATALYZED BY $RuCl_2(CO)_2(P(C_6H_5)_3)_2$

| Time from Start (Min.) | CONVERSION OF: 1-Nitronaphthalene to -Naphthylamine (%) | 2-Nitromesitylene to Mesidine (%) |
|---|---|---|
| 30 | 6 | <1 |
| 60 | 11 | <1 |
| 90 | 18 | <1 |
| 120 | 25 | <1 |
| 180 | 39 | <1 |
| 240 | 57 | <1 |
| 300 | 76 | <1 |
| 360 | 96 | <1 |

EXAMPLE 15

THE NON-SELECTIVE HYDROGENATION OF A 2-NITROMESITYLENE-1-NITRONAPHTHALENE MIXTURE USING RUTHENIUM ACETYLACETONATE AS CATALYST

In a similar example to numbers 13 and 14, but substituting 1.0 mmole (0.48g) of ruthenium acetylacetonate as the ruthenium catalyst, it was demonstrated (see Table XI) that although Ru(CH₃COCHCOCH₃)₃ is an active catalyst for the hydrogenation of nitroaromatics to amines, it is non selective for nitroaromatic, nitropolynucleararomatic mixtures. In this case, nitromesitylene and nitronaphthalene are reduced concurrently.

A similar result was found octanoate. ruthenium actanoate.

TABLE XI

HYDROGENATION OF A NITROMESITYLENENITRONAPHTHALENE MIXTURE CATALYZED BY Ru(CH₃COCHCOCH₃)₃

| Time from Start (Min.) | CONVERSION OF: | |
|---|---|---|
| | 1-Nitronaphthalene to 2-Naphthylamine (%) | 2-Nitromesitylene to Mesidine (%) |
| 5 | 63 | 19 |
| 10 | 80 | 33 |
| 20 | 95 | 58 |
| 30 | >99 | 74 |
| 40 | >99 | 84 |
| 60 | >99 | >99 |

EXAMPLE 16

THE NON-SELECTIVE HYDROGENATION OF 2-NITROMESITYLENE-1-NITRONAPHTHALENE MIXTURE USING Fe(CO)₃(P(C₆H₅)₃)₂ AS CATALYST

Here the hydrogenation procedure of Example 1, and the charge stocks of Examples 13–15 were used, but substituting Fe(CO)₃(P(C₆H₅)₃ as catalyst. The hydrogenation data are summarized in Table XII.

It can be readily seen that Fe(CO)₃(P(C₆H₅)₃ is non-selective for the hydrogenation of nitroaromatic, nitropolynucleararomatic mixtures although the two fractions may be reduced to amine at somewhat different rates.

TABLE XII

HYDROGENATION OF A NITROMESITYLENENITRONAPHTHALENE MIXTURE CATALYZED BY Fe(CO)₃(P(C₆H₅)₃)₂

| Time from Start (Min.) | CONVERSION OF: | |
|---|---|---|
| | 1-Nitronaphthalene to 2-Naphthylamine (%) | 2-Nitromesitylene to Mesidine (%) |
| 20 | 19 | 5 |
| 40 | 36 | 11 |
| 60 | 49 | 18 |
| 80 | 59 | 24 |
| 120 | 74 | 38 |
| 160 | 84 | 52 |

EXAMPLE 17

THE SEQUENTIAL HYDROGENATION OF 1-NITRONAPHTHALENE-p-DINITROBENZENE MIXTURE USING RuCl₂(P(C₆H₅)₃)₃ AS CATALYST

The procedure of Example 1 was repeated using the same catalyst composition but 10 mmole each of 1-nitronaphthalene and p-dinitrobenzene. The progress of the hydrogenations is shown in Table XIII. It can be seen from the data in Table XIII that at least 80% of the polynitroaromatic component (p-dinitrobenzene) is hydrogenated to amine prior to any significant reduction of the second, nitropolyaromatic, substrate with this catalyst.

EXAMPLE 18

THE SEQUENTIAL HYDROGENATION OF 1-NITRONAPHTHALENE-1,4-DINITRONAPHTHALENE MIXTURE USING RuCl₂(P(C₆H₅)₃)₃ AS CATALYST

The procedure of Example 1 was repeated using the same catalyst composition but 10 mole each of 1-nitronaphthalene and 1,4-dinitronaphthalene. 1,4-dinitronaphthalene is selectively hydrogenated to 1-amino-4-nitronaphthalene.

TABLE XIII

SEQUENTIAL HYDROGENATION OF A 1NITRONAPHTHALENE-p-DINITROBENZENE MIXTURE CATALYZED RUTHENIUM RuCl₂(P(C₆H₅)₃)₃

| Time From Start (Min) | Conversion Of: | |
|---|---|---|
| | p-Dinitrobenzene to p-Nitroaniline (%) | 1-nitronaphthalene to α-naphthylamine (%) |
| 5 | 60 | <2 |
| 10 | 91 | 3 |
| 20 | >99 | 7 |
| 40 | >99 | 13 |
| 80 | >99 | 27 |
| 120 | >99 | 40 |

EXAMPLE 19

SEQUENTIAL HYDROGENATION OF A NITROBENZENE-p-DINITROBENZENE MIXTURE CATALYZED BY RUTHEUIUM CHLORIDE IN COMBINATION WITH A QUATERNARY PHOSPHONIUM ION

The compound, believed to be [RuCl₃(CH₃)(C₆H₅)₃ PBr] catalyst was prepared by refluxing ruthenium trichloride (0.4 mmole) with the quaternary phosphonium salt, methyltriphenyl phosphonium bromide (1.2 mmole) in benzene-ethanol. The resulting green catalyst solution so prepared was used in the hydrogenation of an equimolar nitrobenzene, p-dinitrobenzene mixture (10 mmole each). The results are summarized in Table XIV.

It is apparent that with this catalyst solution, p-dinitrobenzene is selectively hydrogenated to p-nitroaniline, and only after some 80% of the dinitrobenzene charged has been reduced to amine is there any subsequent reduction of the nitrobenzene component. A solution of ruthenium trichloride alone is non-selective in this application.

TABLE XIV

SEQUENTIAL HYDROGENATION OF A NITROBENZENE-p-DINITROBENZENE MIXTURE CATALYZED BY [RuCl₃— (CH₃)(C₆H₅)₃ PBr]

| Time From Start (Min) | Conversion Of | |
|---|---|---|
| | p-Dinitrobenzene to p-Nitroaniline (%) | Nitrobenzene to Analine (%) |
| 5 | 10 | 1 |

-Continued

| Time From Start (Min) | Conversion Of p-Dinitrobenzene to p-Nitroaniline (%) | Nitrobenzene to Analine (%) |
| --- | --- | --- |
| 10 | 20 | 1 |
| 20 | 36 | 1 |
| 40 | 60 | 1 |
| 60 | 79 | 3 |
| 80 | 95 | 7 |
| 100 | 99 | 11 |
| 150 | 99 | 21 |

EXAMPLE 20*

THE SELECTIVE AND SEQUENTIAL HYDROGENATION OF A NITROXYLENE ISOMERIC MIXTURE USING A RUTHENIUM HOMOGENEOUS CATALYST

To a suitable autoclave-type reactor provided with pressurizing, heating, cooling, agitating and distillation means is charged in equimolar mixture of 1,2-dimethyl-4-nitrobenzene and 1,3-dimethyl-2-nitrobenzene (1.2 ml, 12.5 mmoles of each component), an 80 ml portion of an equimolar mixture of benzene and ethanol and 0.48 g (0.50 mmoles) of $RuCl_2[P(C_6H_5)_3]_3$ catalyst. That is, the molar ratio of the total nitroxylenes to catalyst is 50:1. After deoxygenating the solvent mixture and dissolving the catalyst and nitroxylenes solution, this solution is sealed under an initial pressure of 50 psig, and heated to 135°C. Hydrogen gas is then introduced into the reactor to a partial pressure of 1200 psig, and reduction of the nitroxylenes is followed by gc analysis of samples withdrawn at regular periods. The results of the hydrogenation are summarized in Table XV. As can be seen, about 80% of the 1,2-dimethyl-4-nitrobenzene is preferentially hydrogenated to 3,4-xylidene (Equation 11) before any significant hydrogenation of the 1,3-dimethyl-2-nitrobenzene isomer is observed. The experiment clearly shows the unique selectivity properties of the $RuCl_2[P(C_6H_5)_3]_3$ complex as a catalyst for the selective hydrogenation of 1,2-dimethyl-4-nitrobenzene to 3,4-xylidine in the presence of its structural isomer, 1,3-dimethyl-2-nitrobenzene.

*Example 46, page 26 of Ser. No. 121,132, now U.S. 3,

Initial hydrogenation reaction:

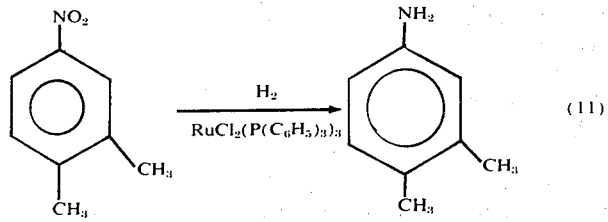

(11)

Subsequent hydrogenation reaction:

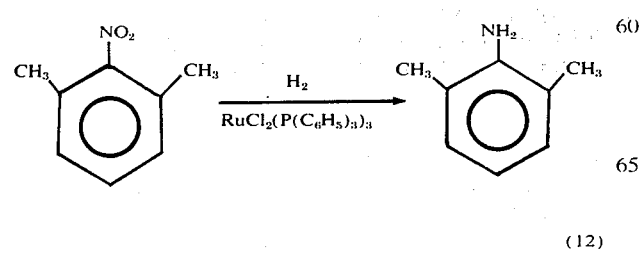

(12)

TABLE XV

SELECTIVE HYDROGENATION OF NITROXYLENE ISOMERIC MIXTURE

| TIME FROM START OF HYDROGENATION (MINS.) | % 4-NITRO-O-XYLENE CONVERTED TO 3,4-XYLIDINE | % 2-NITRO-M-XYLENE CONVERTED TO 2,6-XYLIDINE |
| --- | --- | --- |
| 15 | 18 | 1 |
| 30 | 34 | 2 |
| 45 | 50 | 3 |
| 60 | 64 | 4 |
| 75 | 78 | 5 |
| 90 | 90 | 19 |
| 105 | 100 | 46 |
| 120 | 100 | 90 |
| 135 | 100 | 100 |

Should it be desired to isolate the intermediate 3,4-xylidine reduction product, hydrogenation may be arrested at the appropriate time by cooling and bleeding off the excess hydrogen gas. The recovered product solution is then concentrated by removing the light solvents, and the precipitated ruthenium catalyst. The latter is filtered off and recovered as a brown solid, which is washed with a fraction of petroleum ether and air dried. The amine product may be isolated either by distillation or acid extraction.

EXAMPLE 21

THE SELECTIVE AND SEQUENTIAL HYDROGENATION OF A NITROBENZENE, 2NITROMESITYLENE MIXTURE USING $RuCl_2[P(C_6H_5)_3]_2$ AS CATALYST

Using the apparatus, techniques and catalyst of Example 20, nitrobenzene is preferentially hydrogenated to aniline to the exclusion of 2-nitromesitylene.

The charge comprises an equimolar mixture of nitrobenzene and 2-nitromesitylene (10 mmoles of each component), a 100 ml portion of an equimolar mixture of benzene and ethanol, and 0.38 g (0.40 mmoles) of $RuCl_2(P(C_6H_5)_3)_3$. That is, the molar ratio of the total nitroaromatics to catalyst is 50:1.

The results are summarized in Table XVI. As can be seen, about 95% of the nitrobenzene charged is preferentially hydrogenated to aniline (Eq.13) before any significant reduction of the 2-nitromesitylene component to 2,4,6-trimethylaniline (Eq.14) is observed.

The experiment again confirms the unexpected selectivity of this ruthenium complex as a hydrogenating agent.

Initial hydrogenation reaction:

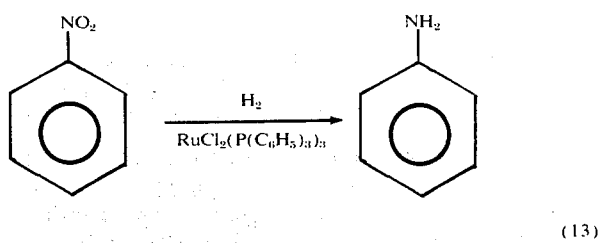

(13)

Subsequent hydrogenation reaction:

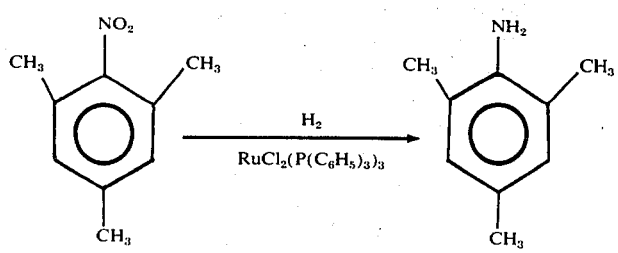

(14)

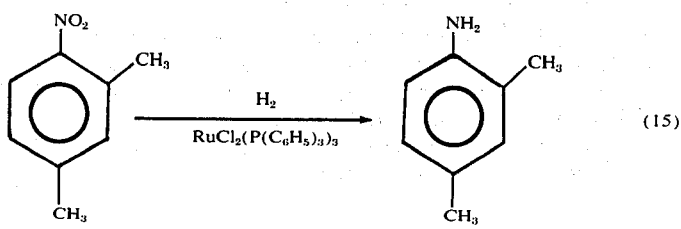

(15)

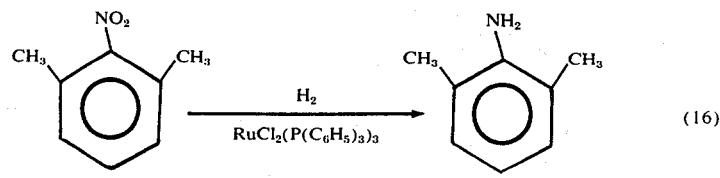

(16)

TABLE XVI

SELECTIVE HYDROGENATION OF NITROAROMATIC MIXTURES

| TIME FROM START OF HYDROGENATION (MINS.) | % NITROBENZENE CONV. TO ANILINE | % 2-NITROMESITYLENE CONV. TO 2,4,6-TRIMETHYLANILINE |
|---|---|---|
| 0 | 0 | 0 |
| 15 | 58 | <1 |
| 30 | 82 | <1 |
| 40 | 94 | 1 |
| 50 | <99 | 11 |
| 60 | 100 | 26 |
| 75 | 100 | 50 |
| 90 | 100 | 79 |
| 120 | 100 | 100 |

TABLE XVII

SELECTIVE HYDROGENATION OF NITROXYLENE ISOMERIC MIXTURE

| TIME FROM START OF HYDROGENATION (MIN) | % 1,3-DIMETHYL-4-NITROBENZENE CONVERTED TO 2,4-XYLIDINE | % 1,3-DIMETYL-2-NITROBENZENE CONVERTED TO 2,6-XYLIDINE |
|---|---|---|
| 15 | 14 | 1 |
| 30 | 27 | 1 |
| 60 | 50 | 3 |
| 90 | 79 | 8 |
| 120 | 100 | 22 |
| 180 | 100 | 50 |
| 240 | 100 | 77 |
| 300 | 100 | 98 |

EXAMPLE 22

THE SELECTIVE AND SEQUENTIAL HYDROGENATION OF A SECOND NITROXYLENE ISOMERIC MIXTURE USING RuCl$_2$[P(C$_6$H$_5$)$_3$]$_2$ AS CATALYST

Using the apparatus, techniques and catalyst of Example 20, 1,3-dimethyl-4-nitrobenzene is preferentially hydrogenated to 2,4-xylidine (Eq.15) to the exclusion of its structural isomer 1,3-dimethyl-2-nitrobenzene.

The charge comprises an equimolar mixture of the two nitroxylene isomers (10 mmoles of each component), a 100 ml portion of an equimolar mixture of benzene and ethanol, and 0.38 g (0.40 mmoles) of RuCl$_2$[P(C$_6$H$_5$)$_3$]$_3$.

The results are summarized in Table XVII. As can be seen, about 80% of the 1,3-dimethyl-4-nitrobenzene charged is preferentially hydrogenated to 2,4-xylidine before any significant reduction of the 1,3-dimethyl-2-nitrobenzene component (Eq.16) is observed.
Initial hydrogenation reaction:

EXAMPLES 23–28

THE SELECTIVE AND SEQUENTIAL HYDROGENATION OF NITROBENZENE, 2-NITROMESITYLENE MIXTURES USING CERTAIN OTHER RUTHENIUM CATALYSTS

Utilizing the apparatus, reduction procedure and equimolar nitrobenzene, 2-nitromesitylene substrate mixture of Example 21, the following ruthenium complexes were employed as homogeneous hydrogenation catalysts for the sequential reduction of this subject application:

RuCl$_3$[As(C$_6$H$_5$)$_3$]$_2$
RuCl$_2$[Sb(C$_6$H$_5$)$_3$]$_3$
[RuCO$_3$Cl$_2$]$_2$
RuCl$_2$[P(p-CH$_3$·C$_6$H$_4$)$_3$]$_3$
RuCl$_2$[P(CH$_3$)$_2$C$_6$H$_5$]$_3$
RuHCl[P(C$_6$H$_5$)$_3$]$_3$

In each of these cases, the nitrobenzene fraction was preferentially hydrogenated to aniline to the substantial exclusion of the 2-nitromesitylene component.

The results, in combination with the data of Examples 14 and 15, confirm that only ruthenium complexes containing one or more π-acceptor (π-acid) ligands will selectively and sequentially hydrogenate a mononitroaromatic substrate contained in mixtures of mononitroaromatic and mononitro ortho-substituted polyalkylaromatic substrates.

EXAMPLES 29–35

THE SEQUENTIAL HYDROGENATION OF CERTAIN OTHER NITROAROMATIC MIXTURES USING $RuCl_2[P(C_6H_5)_3]_3$ AS CATALYST

Utilizing the apparatus, reduction procedure and $RuCl_2[P(C_6H_5)_3]_3$ catalyst of Example 20, the following pairs of mononitroaromatic and mononitro ortho-substituted polyalkylaromatic substrates were sequentially hydrogenated to the corresponding amines according to the subject application.

| EXAMPLE | NITROAROMATIC MIXTURE | |
|---|---|---|
| 29 | p-nitrotoluene | 2-nitromesitylene |
| 30 | p-nitroethylbenzene | 2-nitro-1,3-diethylbenzene |
| 31 | 9-nitroanthracene | nitrodurene |
| 32 | 1,4-dimethyl-2-nitrobenzene | 1,3-dimethyl-2-nitrobenzene |
| 33 | 1,2-dimethyl-3-nitrobenzene | 1,3-dimethyl-2-nitrobenzene |
| 34 | 4-nitrobiphenyl | 2-nitromesitylene |
| 35 | 1,3-dimethyl-5-nitrobenzene | 1,3-dimethyl-2-nitrobenzene |

As can be seen from the numerous examples and compiled data presented in the application, various changes, modifications and substitutions can be made in the claimed process without departing from the inventive concept. The metes and bounds of the invention can best be seen by an examination of the claims which follow, read in conjunction with the preceding disclosure of this application.

What is claimed is:

1. A process for selectively and sequentially hydrogenating the nitro group of a mononitroaromatic substrate contained in a two component nitroaromatic substrate mixture consisting essentially of one mononitroaromatic substrate and one mononitro ortho-substituted polyalkylaromatic substrate, said process consisting essentially of:

1. admixing one mononitroaromatic substrates selected from the group consisting of nitrobenzene, p-nitrotoluene, m-nitrotoluene, p-nitroethylbenzene, 1,2-dimethyl-4-nitrobenzene, 1,2-dimethyl-3-nitrobenzene, 1,4-dimethyl-2-nitrobenzene, 1,3-dimethyl-4-nitrobenzene, 1,3-dimethyl-5-nitrobenzene-1-nitronaphthalene, 2-nitronaphthalene, 4-nitrobiphenyl and 9-nitroanthracene, with one mononitro ortho substituted polyalkylaromatic substrate selected from the group consisting of 2-nitromesitylene, nitrodurene, 1,3-dimethyl-2-nitrobenzene and 1,3-diethyl-2-nitrobenzene in the presence of inert, non-aqueous, non-oxidizing solvent environment, with at least a catalytic quantity of a homogeneous, solubilized ruthenium catalyst selected from the group consisting of $RuCl_2[P(C_6H_5)_3]_3$, $[Ru(CO)_3Cl_2]_2$, $RuCl_2(CO)_2[P(C_6H_5)_3]_2$, $RuCl_3[As(C_6H_5)_3]_2$, $RuCl_2[Sb(C_6H_5)_3]_3$, $RuCl_2[P(p-CH_3.C_6H_4)_3]_3$, $RuClH[P(C_6H_5)_3]_3$ and $RuCl_2[P(CH_3)_2C_6H_5]_3$ to form a reaction mixture, and 2. heating said reaction mixture between about 50°C to about 135°C with at least sufficient hydrogen gas to hydrogenate the nitro group of the one mononitroaromatic said hydrogen gas being supplied at superatmospheric pressure ranging from about 100 psig to about 2000 psig and continuing heating the pressurized reaction mixture until from about 80% to 95% of said nitro group of the mononitroaromatic is converted to the corresponding amine.

2. The process of claim 1 wherein the ruthenium catalyst is $RuCl_2[P(C_6H_5)_3]_3$.

3. The process of claim 1 wherein the ruthenium catalyst is $[Ru(CO)_3Cl_2]_2$.

4. The process of claim 1 wherein the ruthenium catalyst is $RuCl_2(CO)_2[P(C_6H_5)_3]_2$.

5. The process of claim 1 wherein the ruthenium catalyst is $RuCl_3[As(C_6H_5)_3]_2$.

6. The process of claim 1 wherein the ruthenium catalyst is $RuCl_2[Sb(C_6H_5)_3]_3$.

7. The process of claim 1 wherein the ruthenium catalyst is $RuCl_2[P(p-CH_3.C_6H_4)_3]_3$.

8. The process of claim 1 wherein the ruthenium catalyst is $RuClH[P(C_6H_5)_3]_3$.

9. The process of claim 1 wherein the ruthenium catalyst is $RuCl_2[P(CH_3)_2C_6H_5]_3$.

10. THe process of claim 1 in which the mixture is 1,2-dimethyl-4-nitrobenzene and 1,3-dimethyl-2-nitrobenzene.

11. The process of claim 1 in which the mixture is nitrobenzene and 2-nitromesitylene.

12. The process of claim 1 in which the mixture is 1-nitronaphthalene and 2-nitromesitylene.

13. The process of claim 1 in which the mixture is 1,3-dimethyl-5-nitrobenzene and 1,3-dimethyl-2-nitrobenzene.

14. The process of claim 1 in which the nonaqueous, substantially non-oxidizing solvent media is selected from the group consisting of aromatics, alkylated aromatics, chlorinated aliphatic hydrocarbons and mixtures thereof.

15. The process of claim 1 wherein the nonaqueous solvent media contains a solvating agent which is polar and contains a hydroxyl group.

16. The process of claim 15 in which the solvating agent is a mono or polyhydric aliphatic or aromatic alcohol.

17. The process of claim 1 in which the used catalyst is recovered by precipitation after stripping off a substantial quantity of the solvent media.

* * * * *